May 19, 1970 D. R. RORER 3,512,335
VACUUM SYSTEM FOR SKIN PACKAGING APPARATUS
Filed Nov. 22, 1967 2 Sheets-Sheet 1

INVENTOR
Donald R. Rorer
BY Silverman & Cass
ATTORNEYS

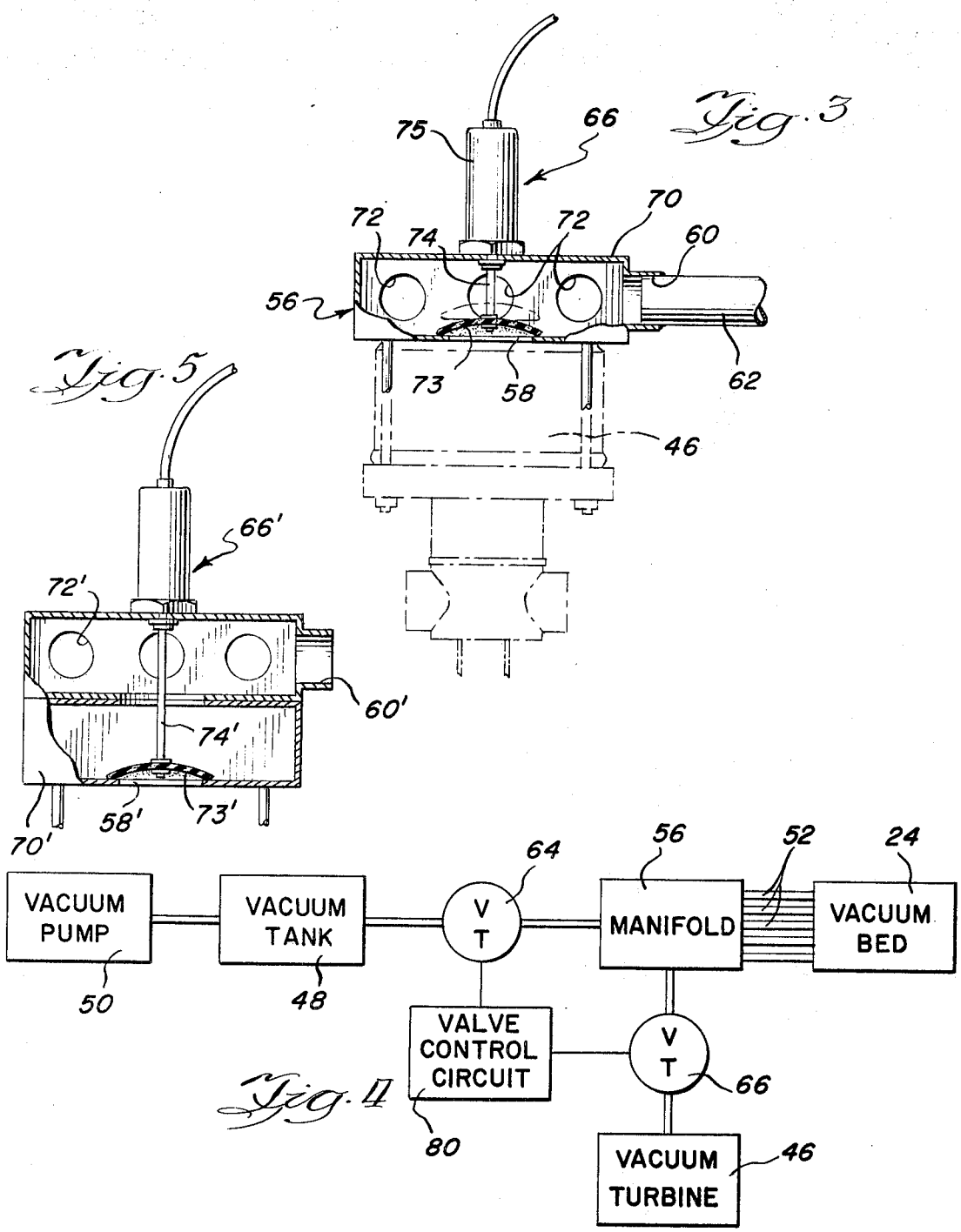

United States Patent Office 3,512,335
Patented May 19, 1970

1

3,512,335
VACUUM SYSTEM FOR SKIN PACKAGING
APPARATUS
Donald R. Rorer, Lake Bluff, Ill., assignor to Stone Container Corporation, Chicago, Ill., a corporation of Illinois
Filed Nov. 22, 1967, Ser. No. 685,206
Int. Cl. B65b 31/02
U.S. Cl. 53—112          11 Claims

ABSTRACT OF THE DISCLOSURE

An air-evacuating system for a vacuum forming machine which employs a vacuum station at which stock film material is so formed. The system having a plurality of air-evacuating units operably connected to the vacuum station by a conduit system and control means, including valving apparatus associated with the conduit system whereby a plurality of air evacuating units may be used alternately or in any desired sequence in conjunction one with the other. Said air-evacuating units including at least one unit which is a high-vacuum source, the other unit or units preferably being high-volume, low-vacuum sources.

BACKGROUND OF INVENTION

This invention relates generally to an improved vacuum system for a skin-packaging machine or the like, and more particularly, is concerned with a vacuum system that employs selectively operable, plural air-evacuating means, the said plural air-evacuating means being constructed and controlled so that a forming operation may be attained wherein initially a large volume of air is withdrawn from under the material to be formed, and then said material is subjected to a high-pressure vacuum to provide for a rapid final draw-down.

Initially, skin-packaging technique was employed advantageously for packaging relatively small consumer items especially suitable for sale by self-service merchandising. The base pad or substrate can serve a dual function in that it provides a base for the article and, since it can be viewed through the transparent plastic film, it can carry, by imprinting or otherwise, advertising and other informative matter. The advantages of this packaging technique for relatively small consumer items is well recognized today.

Briefly, the basic steps involved in all skin-packaging techniques are substantially the same. First, the article or articles to be packaged are placed on a base pad or substrate, which may be coated with an adhesive or chemically conditioned in some other manner to assure adhesion of the plastic film to the surface thereof, or the film used may be of a type which is self-adhering, or a combination of both may be used. The article or articles are positioned on the base pad and the pad is placed on a platen or other supporting means on the skin packaging machine associated with a vacuum source. The plastic film is heated to a predetermined forming temperature and draped over the article carrying substrate. Then, the volume of space between the film and substrate is evacuated to draw the film over the article and into laminar contact with the exposed upper surface of the substrate.

The advantages of using skin packaging techniques for relatively large industrial-type articles, such as lamps, clutch plates, gears, etc., thereafter became apparent to manufacturers and attempts were made to adapt known apparatus and films to the packaging of said larger articles. However, due to the increased height or profile of these larger items, many problems were raised that were not encountered in the packaging of the smaller consumer articles.

In the packaging of such large articles, it was often unadvisable and uneconomical to employ corrugated board for the substrate. Thus, packaging was attempted with boxboard which is considerably stronger and somewhat cheaper than corrugated board. While the use of boxboard was satisfactory in some respects, boxboard is less porous than corrugated board. Vacuum systems of existing machines could not and did not evacuate the volume of space sufficiently rapidly and consistently to promote desired results. Due to increased profile of these larger items, as compared to the aforementioned smaller items, a larger volume of air was trapped between the substrate and the film material. The net result was that the forming operation took considerably longer than was desired and necessary for the production of a high-quality package.

Also, when the packaging of larger items was attempted with prior art machines, the height of said items required increased stretching or drawing of the film to bring same into laminar contact with the substrate. Thus, with this longer drawing or forming operation cold flow of the sheet material was greater, and the heated film would often thin out and rupture during forming or immediately thereafter. To avoid this contingency, it was necessary to employ heavier gauge films, but since these heavier films were more expensive, many of the economic advantages realized from the skin-packaging process were offset to some degree by such increased film costs. Further, the heavier guage films gave rise to another problem in that they required higher forming temperatures and increased heating cycles, factors which increased the operating cycle time of the machine.

Another difficulty encountered was that the film then in use required a chemically conditioned substrate to insure adherence thereto, such conditioning process increasing the overall cost. To overcome this problem and permit the manufacturers to use cheaper, boxboard substrates, films were developed which became tacky or sticky upon heating so that they were capable of self-adherence to an unconditioned substrate. While these films solved the problem of the high cost of chemically conditioned substrates, they required for the production of a quality package uniform heating and a rapid draw-down. If too long a period of time elapses between heating and the completion of the forming cycle, the film will cool somewhat and will not adhere properly to the substrate. In attempting to provide for the rapid draw-down required by these self-adhering films, vacuum system were employed which provided a source of extremely high vacuum. These systems normally used a vacuum tank or some other source which, while providing the high-vacuum pressures required, was not capable of withdrawing the larger volumes of air encountered in the packaging of high-profile items. In addition, these system were not adapted for use in packaging operations where the materials used and articles to be packaged required a high-volume, low-vacuum system.

An extremely important consideration in the effecting of rapid high-pressure draw is that the application of the vacuum must be uniform. Prior art system, such as illustrated in U.S. Pat. Nos. 3,202,278 and 3,109,081, issued to R. Taylor and H. B. Morse, respectively, normally employed a box-like compartment immediately below the supporting surface for the substrate and a single passageway or conduit leading therefrom to the air-evacuating unit. Obviously, upon evacuation using these systems, the vacuum is much stronger adjacent the center of the supporting area and diminishes radially outward toward the edges of said area. While systems of this type will perform to some degree of efficiency, it can be appreciated that

SUMMARY OF THE INVENTION

The invention is characterized by the provision of a vacuum system for skin-packaging machines or the like in which there are provided plurality air-evacuating means in communication with the forming or work area of said machine. One of said plural evacuating means is provided to be capable of subjecting the film material to a relatively high-pressure vacuum for effecting a rapid draw-down, while the other of said evacuating means is capable of withdrawing large volumes of air from the forming area while producing a lower pressure vacuum. Said system, further, is so oriented and controlled that where the particular article is to be packaged and the materials used require the evacuation of a large quantity of air and a rapid draw-down, the high-volume evacuating means may be employed to initiate the forming cycle and the high-pressure vacuum source coupled into the system at a subsequent point in the forming operation to provide for a rapid final draw-down. The control means for the system enables either of the air-evacuating means to be used separately or in conjunction with each other. Also, the sequence or timing of the use of said evacuating means is selectively variable to accommodate various kinds of packaging materials having different characteristics.

BRIEF DESCRIPTION OF THE DRAWINGS

FIG. 3 is a partial sectional view of a manifold and valve arrangement of the vacuum system embodying the invention; the vacuum turbine which is preferably mounted to the underside of the manifold and the mounting arrangement for said turbine is illustrated in phantom, as is the valve in its position assumed when said turbine is in operation.

FIG. 4 is a schematic illustration of a vacuum system embodying the present invention.

FIG. 5 is a partial sectional view similar to that of FIG. 3 but of an alternate form of manifold construction.

DETAILED DESCRIPTION OF THE ILLUSTRATED EMBODIMENT

Figure 1:
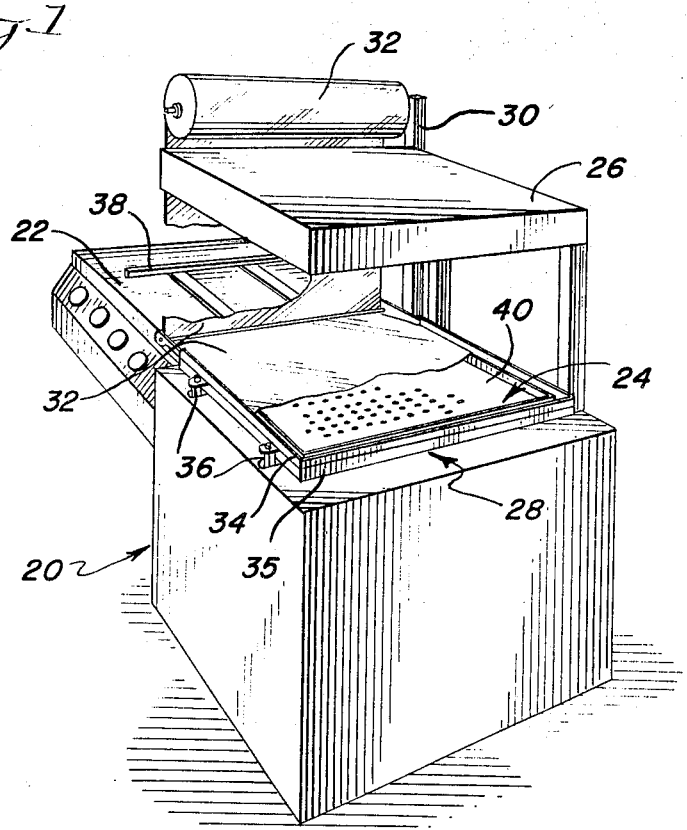
FIG. 1 is a perspective view of a representative skin-packaging machine having the vacuum system embodying the invention associated therewith.

Referring to the drawings, FIG. 1 shows a skin-packaging machine, designated generally by the reference character 20, the construction and operation of which is similar to that disclosed in detail in applicant's co-pending application, Ser. No. 609,824, filed Jan. 17, 1967, and entitled "Skin Packaging Apparatus." However, it should be understood that the herein invention is not limited in use to the machine of FIG. 1.

The machine 20 includes a loading station 22, a vacuum forming station 24, a stationary heating unit 26, a vertically movable drape frame 28, and a boom 30 for supporting the plastic sheet material 32. In operation, the sheet material 32 is clamped between the upper and lower open frame members 34 and 35 which form drape frame 28. Initially, the drape frame 28 is raised to the heating position immediately below the heating unit 26 by means of the rack gears 36 affixed to the lower frame member 35 which are engageable by suitable drive means (not shown). While the drape frame 28 is in the elevated position, a substrate and associated article are advanced from loading station 22 to the vacuum bed or forming station 24 by the infeed pusher 38. After sheet material 32 is heated to the desired temperature, the drape frame 28 is lowered into surrounding engagement with the vacuum bed 24 so as to drape the heated sheet material 32 over the article or articles on the substrate. The vacuum-producing apparatus (not shown in FIG. 1) is operated to draw the film into sheath-like engagement with the article and into laminar contact with the substrate.

The herein invention is concerned with the vacuum-forming phase of the aforesaid packaging cycle of operation of a machine, such as machine 20. One embodiment of the invention is illustrated in FIG. 2, while the basic inventive concept is illustrated schematically in FIG. 4.

The vacuum system embodying the invention is comprised of a plurality of air-evacuating units, one of which is a high-volume, low-pressure source while the other, where two units are involved, is a low-volume, high-pressure source, a conduit system including tubing members linking each of said air-evacuating units to the vacuum bed 24 for withdrawal of air therefrom and control means for operably coupling the evacuating units with the conduit system at the desired time in the forming cycle. The vacuum bed 24 is of a box-like construction having a perforated top surface 40 and a multi-apertured bottom surface 42 preferably provided by the upper panel of the cabinet of machine 20. The substrate 43 is intended to be supported upon the surface 40 during the operating cycle of the machine.

Figure 2:
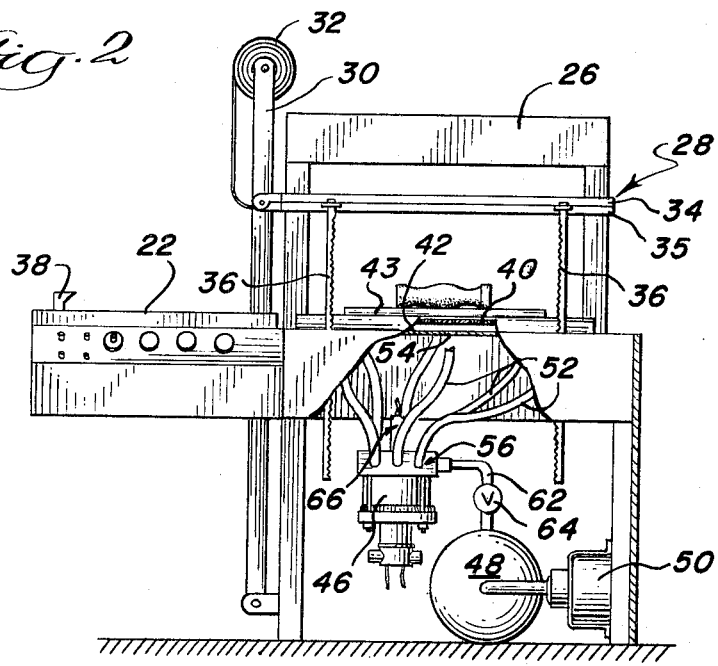
FIG. 2 is a front elevational view of said machine with a portion of the cabinet removed to show the preferred embodiment of the vacuum system of the present invention; the entire drive arrangement for the drape frame and other operating parts which normally may be housed in said cabinet are omitted for purposes of clarity.

In FIG. 2, the plural air-evacuating units are seen to include a vacuum turbine 46 and a vacuum tank 48, said tank preferably having an evacuating pump 50 connected therewith to restore said tank to an operating condition after each forming cycle. Vacuum turbine 46 exhausts to the surrounding atmosphere. Thus, it is designed to be capable of withdrawing large volumes of air from the vacuum bed, the quantity of which is limited only by the size of the turbine employed and its period of operation. While the vacuum produced by turbine 46 is sufficient for many packaging situations, turbine 46 is not adapted for effecting a rapid, high-pressure forming step. Vacuum tank 48 provides the low-volume, high-pressure unit for the system, the degree of vacuum available depending upon the efficiency of pump 50. It can be appreciated that the volume of air withdrawn by tank 48 is limited by the size of the tank employed and cannot approach the quantity of air withdrawn by the turbine 46 in a relatively short period of time.

The conduit system of the illustrated embodiment includes a plurality of tube or conduit sections 52, each having one end thereof in communication with one of the plurality of apertures 53 in the bottom surface 42 of vacuum bed 24 and the opposite end thereof connected to the inlet port of a manifold 56. Manifold 56, which constitutes a portion of the conduit system, communicates between turbine 46 and vacuum tank 48 by means of the outlet port 58 in turbine 46 and the outlet port 60 and tube section 62 leading to tank 48. Accordingly, the individual paths of communication linking turbine 46 and vacuum tank 48 with the vacuum bed 24 are coincidental only in the areas of the inlet ports of manifold 56 and the tube sections 52.

To attain the aforementioned forming sequence, viz., using a high c.f.m., low-vacuum unit to initiate the forming cycle and effecting a rapid final draw-down with a high-pressure vacuum unit, the herein vacuum system is provided with control means which permits the selective coupling and uncoupling of the turbine 46 and tank 48 with the conduit system. The control means includes valve means 64 and 66 located in the paths of communication between the respective air-evacuating units 46 and 48 and manifold 56. To provide for an automatic packaging cycle, the control means would have to include also various timers, relays and other circuitry to operate said valve means 64 and 65 at the proper point in said cycle to produce the desired sequence of operation. Such timers, relays, etc., have not been shown herein because they can be of conventional, well-known construction.

The construction of manifold 56 is illustrated in FIG. 3. Said manifold 56 is comprised of a rectangular box-like housing 70 having a plurality of inlet ports 72 in opposed vertical walls for communication with the conduit or tube sections 52, and outlet ports 58 and 60. Outlet port 58 preferably is formed in the bottom wall of housing 70 so that said housing may be mounted astride turbine 46, with the inlet port of turbine 46 and outlet port 58 in registry.

The valve means 66 is comprised of a flexible, cup-shaped diaphragm 73 connected to one end of a reciprocable rod 74, which is connected to an actuating member 75. When the rod 74 and diaphragm 73 are in the solid outline position illustrated in FIG. 3, diaphragm 73 covers port 58 and prevents communication between said turbine and said housing. When the diaphragm 73 is in the position illustrated in phantom, port 58 is unobstructed and turbine 46 is capable of withdrawing air from housing 70. The actuating member 75 of valve 66 may be one of various suitable types, for example, a solenoid or double-acting fluid piston arrangement, the specifics of which are well known and immaterial to the instant invention.

FIG. 5 illustrates a modified form of the manifold shown in FIG. 3, with like parts being designated by the same reference characters, albeit, primed. Accordingly, manifold 56' differs from manifold 56 basically only in the provision of a two-compartment housing 70', the outlet port 60' and inlet ports 72' being associated with the upper compartment, while outlet port 58' is formed in the lower compartment. Valve 66' includes an actuator rod 74' which is longer than rod 74 so as to be suitable for operation in the two-compartment housing 70'.

While the manifold assembly 56 has been satisfactory in operation for the most part, it has been learned that in some situations there is a tendency for diaphragm 73 to become unseated when vacuum tank 48 is connected into the system. However, in the assembly 56', placing the port 58' and diaphragm 73' in a separate compartment, has resulted in less incidence of unseating of the diaphragm 73' during high-vacuum situations produced by tank 48.

Operation of the dual vacuum system is generally as follows: After sheet 32 is clamped in a drape frame 28 and said frame is raised to the heating position, the pusher 38 advances the substrate and associated article to the vacuum forming station 24. Timers and other control means (not shown) regulate the heating cycle to assure that sheet material 32 reaches the proper forming temperature. Once the proper forming temperature is reached, drape frame 28 is automatically lowered into surrounding engagement with the vacuum bed 24, draping the sheet material 32 over the substrate and associated article. Sometime prior to or simultaneous with the last mentioned draping step of the packaging cycle, the control means for the vacuum system actuates the turbine 46, the valve 66 being in the open position at this time. Thus, as the heated sheet material 32 is being draped over the substrate and associated article, turbine 46 is continuously evacuating the air from the space that eventually will be formed therebetween, thus turbine 46 may be termed the primary vacuum unit. Depending upon the profile of the article and other factors affecting the amount of air trapped, at a preselected point in the machine cycle, the valve control circuit, designated 80 in FIG. 4, automatically operates valve 66 to the blocking position for port 58, and in conjunction therewith, opens valve 76 to couple vacuum tank 48 into the conduit system. Up to this point in the forming operation, the hot film is gently drawn about the article as a major portion of the air trapped under sheet 32 is removed by turbine 46. Upon introduction of the vacuum tank 48, the remainder of the air is evacuated by reason of a sudden drop in the pressure on the underside of the sheet material; this sudden drop gives rise to a greatly increased pressure differential which in effect urges the hot film into engagement with the substrate rapidly and under high pressure, thus, the vacuum tank 48 may be termed the secondary vacuum unit.

In practice, the actual time elapsed between the end of the heating cycle and the snapping of the film to the substrate is a matter of a few seconds, at the very most. Accordingly, since the film 32 has had little time to cool, which it will do quite rapidly, a superior film to substrate bond is attained. Also significantly lower forming temperatures and shorter heating cycles may be utilized. Where high-profile items are packaged, the rapid forming step greatly reduces the cold flow of the heat material, viz., the amount the thickness of the hot film will be reduced when stretched during the vacuum draw. Thus thinner gauge and less expensive film may be employed.

In practice, the control means for the entire machine includes the vacuum system control means, as well as additional relays, switches, circuitry, etc., controlling the other operations of the packaging cycle, thus, the elements of the overall control system may be adjusted to attain any sequence of operation desired. For example, the valve control circuit 80 may be adjusted so that one of the valves 66 or 64 remains closed during the entire cycle, while the other of said valves is operated so that forming is effected entirely by turbine 46 or tank 48, whichever is desired.

The invention has been particularly pointed out in the claims hereto appended. It is intended that the claim language be construed broadly commensurate with the progress in the arts and sciences contributed thereby.

What is claimed is:

1. A manifold assembly for use with a vacuum system for withdrawing air from the work station of a vacuum forming machine, wherein said system employs primary and secondary air-evacuating units, said manifold comprising; a housing; a plurality of inlet ports formed in said housing and adapted to be connected operatively with said work station; outlet port means formed in said housing for connection with said primary and secondary units, whereby when said manifold is so connected a path of communication is established between each of said air-evacuating units and said work station, each of said paths including said housing; and valve means mounted to said housing and adapted upon the operation thereof selectively to block one of said paths of communication while leaving the other of said paths unobstructed.

2. A manifold as defined in claim 1 wherein the said valve means is positioned to block communication between the primary air-evacuating unit and said work station.

3. A manifold assembly for use with a vacuum system for withdrawing air from the work station of a vacuum forming machine, wherein said system employs primary and secondary air-evacuating units, said manifold comprising; a housing; a plurality of inlet ports formed in said housing and adapted to be connected operatively with said work station; outlet port means formed in said housing for connection with said primary and secondary units, whereby when said manifold is so connected a path of communication is established between each of said air-evacuating units and said work station, each of said paths including said housing; and valve means mounted to said housing and adapted upon the operation thereof selectively to block one of said paths of communication while leaving the other of said paths unobstructed, said housing including upper and lower compartments defined by a parting wall, the inlet port and the outlet port means for the secondary air-evacuating unit opening into said upper compartment, said outlet port means for the primary air-evacuating means opening into the lower compartment, said parting wall being apertured to provide for communication between said upper and lower compartments.

4. A manifold as defined in claim 2 wherein said valve means comprises a reciprocable rod having a flexible diaphragm secured to one end thereof, said diaphragm being movable to a position engaged around the outlet port communicating with the primary air-evacuating unit whereby to block communication between the primary air-evacuating unit and the work station.

5. A manifold as defined in claim 3 wherein said valve means comprises a reciprocable rod having a flexible diaphragm secured to one end thereof, said diaphragm being movable to a position engaged around the outlet port communicating with the primary air-evacuating unit whereby to block communication between the primary air-evacuating unit and the work station.

6. An air-evacuating system for use in a skin-packaging machine or like vacuum-forming apparatus for stock material, said apparatus including a vacuum station by which the forming operation is performed, said system comprising:
   (a) conduit means to be associated with said vacuum station and including a manifold;
   (b) primary and secondary air-evacuating units operatively coupled with said conduit means to provide a path of communication between the vacuum station and each of the air-evacuating units;
   (c) the primary air-evacuating unit being capable of subjecting a stock material to a high-pressure vacuum;
   (d) control means connected for selective operation of said air-evacuating units during the operating cycle of the apparatus so as to enable the air-evacuating units to be used either separately or conjointly;
   (e) the manifold comprising
       (i) a housing having a plurality of inlet ports adapted to be connected to the vacuum station, and outlet port means for connection with the primary and secondary units, said conduit means being connected to provide a conduit path between each of the air-evacuating units and the vacuum station, each of said paths including the housing; and
       (ii) valve means associated with said housing and adapted upon the operation thereof selectively to block one of said paths while leaving the other of said paths unobstructed.

7. A manifold as defined in claim 6 wherein the said valve means is positioned to block communication between the primary air-evacuating unit and said work station.

8. A manifold as defined in claim 7 wherein said valve means comprises a reciprocable rod having a flexible diaphragm secured to one end thereof, said diaphragm being movable to a position engaged around the outlet port communicating with the primary air-evacuating unit whereby to block communication between the primary air-evacuating unit and the work station.

9. A manifold as defined in claim 6 wherein the said housing includes upper and lower compartments defined by a parting wall, the inlet port and the outlet port means for the secondary air-evacuating unit opening into said upper compartment, said outlet port means for the primary air-evacuating means opening into the lower compartment, said parting wall being apertured to provide for communication between said upper and lower compartments.

10. A manifold as defined in claim 9 wherein said valve means comprises a reciprocable rod having a flexible diaphragm secured to one end thereof, said diaphragm being movable to a position engaged around the outlet port communicating with the primary air-evacuating unit whereby to block communication between the primary air-evacuating unit and the work station.

11. The system as defined in claim 6 wherein the conduit means further comprise a plurality of tubes each having one end thereof in communication with the vacuum station and the opposite end thereof in communication with the manifold.

References Cited

UNITED STATES PATENTS

| | | | |
|---|---|---|---|
| 2,126,532 | 8/1938 | Cate | 53—112 X |
| 2,781,078 | 2/1957 | Douidio. | |
| 2,989,827 | 6/1961 | Groth | 53—22 |

TRAVIS S. McGEHEE, Primary Examiner

U.S. Cl. X.R.

18—19